(12) United States Patent
Lu et al.

(10) Patent No.: US 7,660,439 B1
(45) Date of Patent: Feb. 9, 2010

(54) METHOD AND SYSTEM FOR FLOW DETECTION AND MOTION ANALYSIS

(75) Inventors: Tiehan Lu, Chandler, AZ (US); Ibrahim Burak Ozer, Plainsboro, NJ (US); Wayne Wolf, Princeton, NJ (US)

(73) Assignee: Verificon Corporation, Princeton, NJ (US)

( * ) Notice: Subject to any disclaimer, the term of this patent is extended or adjusted under 35 U.S.C. 154(b) by 686 days.

(21) Appl. No.: 11/014,545

(22) Filed: Dec. 16, 2004

Related U.S. Application Data

(60) Provisional application No. 60/529,879, filed on Dec. 16, 2003.

(51) Int. Cl.
*G06K 9/00* (2006.01)
*G06K 9/46* (2006.01)
*H04N 5/14* (2006.01)

(52) U.S. Cl. .................. 382/107; 382/103; 382/199; 348/699

(58) Field of Classification Search .......... 382/103, 382/107, 236, 168–179, 199; 248/154–155; 386/28, 27; 73/488, 551; 348/153–169; 356/27–29
See application file for complete search history.

(56) References Cited

U.S. PATENT DOCUMENTS

| | | | | |
|---|---|---|---|---|
| 5,072,293 A | | 12/1991 | De Haan et al. ............ 375/240 |
| 5,500,673 A | * | 3/1996 | Zhou ...................... 348/156 |
| 5,512,939 A | * | 4/1996 | Zhou ...................... 348/14.12 |
| 5,682,438 A | | 10/1997 | Kojima et al. ............. 382/107 |
| 6,236,738 B1 | * | 5/2001 | Zhu et al. ................. 382/107 |
| 6,263,088 B1 | * | 7/2001 | Crabtree et al. ........... 382/103 |
| 6,366,701 B1 | * | 4/2002 | Chalom et al. ............. 382/236 |
| 6,480,615 B1 | * | 11/2002 | Sun et al. ................. 382/103 |
| 6,563,874 B1 | | 5/2003 | Lu ......................... 375/240 |
| 6,567,469 B1 | | 5/2003 | Rackett .................... 375/240 |
| 6,668,020 B2 | | 12/2003 | Ma et al. .................. 375/240 |
| 6,687,295 B1 | | 2/2004 | Webb et al. ................ 375/240 |
| 6,687,301 B2 | | 2/2004 | Moschetti ................. 375/240 |
| 6,697,427 B1 | | 2/2004 | Kurak et al. ............... 375/240 |
| 6,728,395 B1 | * | 4/2004 | Kage et al. ................ 382/107 |
| 7,085,401 B2 | * | 8/2006 | Averbuch et al. ........... 382/103 |
| 2001/0008561 A1 | | 7/2001 | Paul et al. ................. 382/103 |
| 2002/0090132 A1 | | 7/2002 | Boncyk et al. ............. 348/154 |
| 2003/0062997 A1 | | 4/2003 | Naidoo et al. .............. 340/531 |
| 2003/0081836 A1 | * | 5/2003 | Averbuch et al. ........... 382/199 |
| 2003/0128298 A1 | | 7/2003 | Moon et al. ............... 348/578 |
| 2004/0032970 A1 | * | 2/2004 | Kiraly .................... 382/103 |
| 2004/0086091 A1 | | 5/2004 | Naidoo et al. .............. 379/37 |
| 2004/0120581 A1 | | 6/2004 | Ozer et al. ................. 382/224 |

(Continued)

OTHER PUBLICATIONS

Ozer, I.B., "Object Detection and Activity Recognition in Digital Image and Video Libraries," Ph.D. Thesis, NJIT, (2001).

(Continued)

*Primary Examiner*—Samir A. Ahmed
*Assistant Examiner*—Mehdi Rashidian
(74) *Attorney, Agent, or Firm*—Lowenstein Sandler PC

(57) ABSTRACT

A surveillance system receives video data of a monitored scene and identifies flows of motion in the scene. Specifically, a video camera communicates with a video recognition system, which identifies a flow motion region of a monitored scene and determines characteristics of the identified flow motion region.

31 Claims, 14 Drawing Sheets

U.S. PATENT DOCUMENTS

| | | | |
|---|---|---|---|
| 2004/0135685 A1 | 7/2004 | Hane | 340/539 |
| 2004/0189460 A1 | 9/2004 | Heaton et al. | 340/500 |
| 2005/0013467 A1* | 1/2005 | McNitt | 382/107 |
| 2007/0003151 A1* | 1/2007 | Kawahara | 382/239 |

OTHER PUBLICATIONS

Lucas, B.D. et al., "An Iterative Image Registration Technique With An Application To Stereo Vision," Proceedings of Imaging Understanding Workshop, pp. 121-130 (1981).

* cited by examiner

Fig. 6
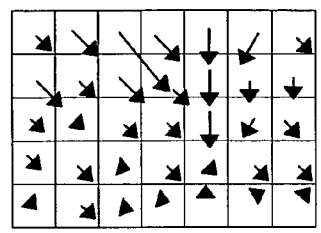
Frame w/Local Motion Vectors 502
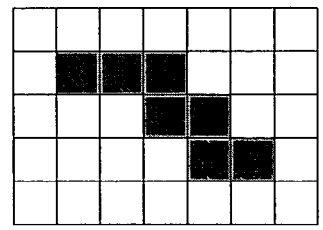
Mask 602
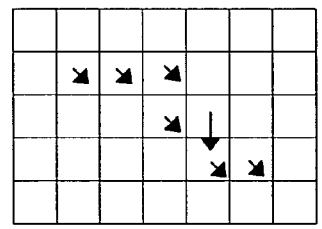
Masked Motion Vectors 603
Fig. 7
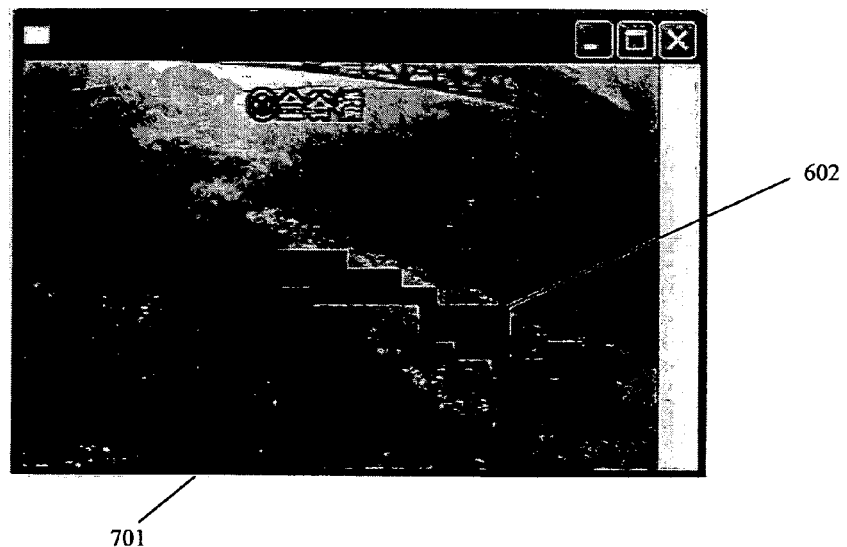

Ellipse-fitted flow motion region 801

Fig. 10
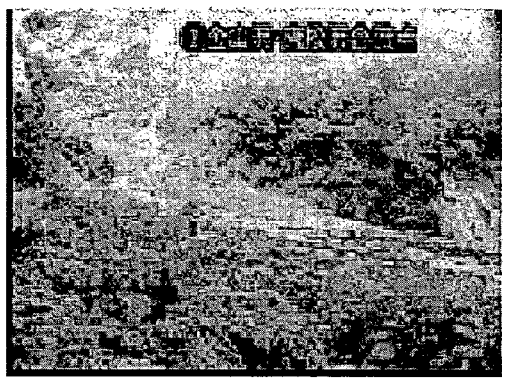
1000
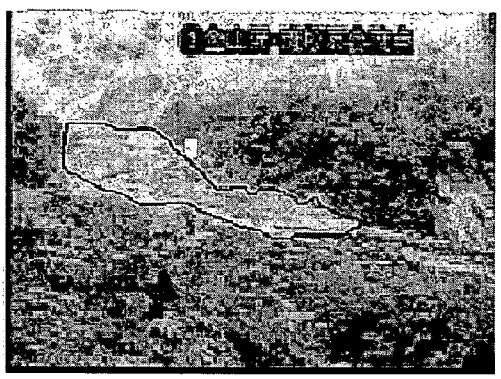
1001
1002
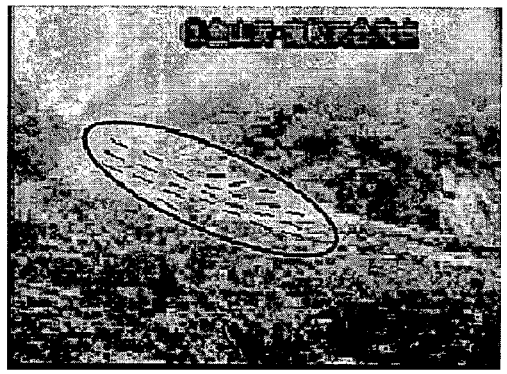
1003

METHOD AND SYSTEM FOR FLOW DETECTION AND MOTION ANALYSIS

CROSS-REFERENCE TO RELATED APPLICATION

This application claims the benefit of U.S. Provisional Application No. 60/529,879, by Tiehan Lu, I. Burak Ozer, and Wayne Wolf, entitled "Method and Apparatus For Automatically Detecting Flows", filed on Dec. 16, 2003. The entire disclosure of U.S. Provisional Application No. 60/529,879 is hereby incorporated herein by reference.

FIELD OF THE INVENTION

The present invention relates to methods and systems for providing real-time video surveillance of a monitored area so that flow motion, such as, for example, the flow of mud or debris may be recognized. More specifically, this invention relates to an automatic video analysis system for detecting a presence and characteristics of a flow in real time.

BACKGROUND OF THE INVENTION

Today, different types of sensor networks are used to create warning systems for natural disasters, such as flooding and land/mud sliding. Frequently, these systems include one or more video devices (i.e., cameras) for monitoring and capturing images of a scene which includes one or more objects or events of interest.

According to these conventional monitoring systems, images captured by a video device are analyzed using standard object detection and modeling techniques, which focus on objects such as human, animals, vehicles, roads, etc. Generally, these techniques are limited to the detection of static and rigid target objects with low variance in color and shape. For example, U.S. Patent Application Publication No. 2001/0008561 (of Paul et al.) describes a tracking method based on color, shape, and motion. In another example, U.S. Patent Application Publication No. 2003/0128298 (of Moon et al.) describes a color-based object tracking system. However, according to both of these exemplary approaches, a static target object must first be identified by an operator and tracked starting from a marked sequence. Further, these monitoring systems are not automated, requiring constant supervision by one or more operators. As such, these systems can not be used to recognize and analyze scenes which include a flow.

Commonly, flows exist in a variety of forms including but not limited to water, mud, animals, people, and vehicles. Further, certain flows can be dangerous or even deadly, thus requiring constant monitoring and supervision. In these cases, a monitoring system must not only detect and identify the flow regions, but also determine the flow motion's behavior over time.

Typically, this motion, defined as the displacement of the flow between two images captured in time, is measured using motion vectors. U.S. Pat. No. 5,682,438 (issued to Kojima et al.) describes an exemplary method for calculating motion vectors. This patent is incorporated herein by reference in its entirety.

Motion vectors are used as the basis of many conventional systems to estimate the motion of an object (see for example, U.S. Pat. Nos. 6,697,427 (issued to Kurak et al.), 6,687,301 (issued to Moschetti), 6,687,295 (issued to Webb et al.), 6,668,020 (issued to Ma et al.), 6,567,469 (issued to Rackett), and 6,563,874 (issued to Lu), etc.). These conventional systems typically approximate the best match of blocks between video frames. The quality of a match between two corresponding blocks is measured by the sum of the absolute difference of corresponding pixels in the blocks, as is known in the art. However, such a matching technique may not result in an accurate estimation of the physical location change of an object over a number of video frames, known as 'true' motion.

Exemplary true motion estimation methods are described in an article entitled "An iterative image-registration technique with an Application to Stereo Vision", DARPA Image Undersing Workshop, pp. 121-130 (1981) by B. D. Lucas et al., and U.S. Pat. No. 5,072,293 (issued to Dehaan et al.), both of which are incorporated herein by reference in their entirety.

While true motion estimation is critical to flow motion detection, systems employing these methods fail to distinguish between flow motion of a targeted object and other ambient non-flow motion, such as the movement of trees, flying birds, rain, etc. These and other foreign objects obstruct the targeted object resulting in significant occlusion problems.

Another drawback to existing video monitoring systems is the lack of efficient alarming capabilities. Specifically, these systems do not provide alarms and warning messages, store and transmit detected signals, or control security devices.

In addition, due to bandwidth limitations, conventional systems can not process and transmit multi-channel video in real-time to multiple locations. Thus, existing systems are limited in that they do not provide an efficient cross-layer optimization wherein the detection of an event and an alarm type are synchronized to transmit alarm data to an operator. Cross-layer optimization techniques, known in the art, apply joint optimization to different layers of a system. For example, in an object extraction system, cross layer optimization may include joint optimization of a low-level feature extraction layer, a high-level feature labeling, and an operator-interface layer to query regarding the object of interest.

In sum, conventional video surveillance systems employ simple motion detection that do not identify and analyze flow motion regions of an image, detect the occurrence of flow events, track the motion of a flow motion region, distinguish between target flow motion and other ambient motion, and provide efficient alarm management.

Accordingly, there is a need in the art for an automated monitoring system that provides accurate real-time flow detection and flow motion analysis with an efficient alarm capability.

SUMMARY OF THE INVENTION

The present invention relates to a method and a system for identifying flow motion in a region and determining characteristics or behavior of the identified flow motion.

According to an embodiment of the invention, an image capturing device, such as a video camera, monitors a scene that contains one or more areas or events of interest, referred to as target areas. The image capturing device obtains inputted video data of images of the one or more target areas in the form of a plurality of frames to a video recognition system.

According to an embodiment of the invention, the video recognition system performs a flow motion analysis on the plurality of frames to identify a flow motion region in the frames. Once identified, the flow motion region is analyzed to determine the characteristics of the flow motion, such as, for example, the flow's location, size, velocity, speed, direction, angle, or danger level.

According to an embodiment of the invention, the flow motion analysis estimates the motion present in a target area by analyzing a number of frames using motion vectors. The motion vectors are used to identify an initial or predicted flow motion region. To more accurately identify the flow motion region, the predicted flow motion region is refined. More specifically, the flow motion analysis according to the invention involves iterative refinements of the initially predicted flow motion region. These refinements are performed according to techniques known in the art, such as, thresholding and temporal filtering. These refinements increase the accuracy of the flow motion identification by reducing the effects of motion noise, referred to as non-flow motion, typically caused by foreign objects, such as, for example, an animal, person, or tree. Following refinement of the predicted flow motion region, a mask corresponding to the refined flow motion region is generated. The mask is then applied to unrefined, or raw, frames of the inputted video data to mask a flow motion region, referred to as a masked area. In a preferred embodiment, the masked area is further refined for increased accuracy, resulting in an identified flow motion region. This identified flow motion region is then analyzed to determine the characteristics of the flow motion.

Optionally, the motion of the inputted video data (i.e., the movement of the video camera), referred to as global motion, can be eliminated using a known camera-motion estimation method. According to this embodiment, the global motion is estimated and compensated to produce a frame with primarily motion vectors associated with the targeted area, referred to as local motion vectors. As such, the system is able to distinguish between undesired camera motion and target flow motion, thus increasing the system's overall robustness and accuracy.

According to another embodiment of the invention, the system performs an attribute modeling analysis to detect a flow motion region. The detected flow motion region is analyzed using the flow motion analysis according to the invention to determine characteristics of the flow.

In this embodiment, the background of the video input frame is eliminated, leaving only a foreground object, or predicted flow motion region. A contour outline, or contour following, of the predicted flow motion region is generated and corresponding contour points are used to fit the outline with a shape, preferably, an ellipse. The parameters of the ellipse fitted to the predicted flow motion region are used to determine attributes of the predicted flow motion region. The attributes, for example, color and shape, are used to model a detected flow motion region by comparing the acquired attributes to attributes stored in a database. The detected flow motion region then may be refined according to known techniques (i.e., thresholding and temporal filtering) to produce an identified flow motion region. A flow motion analysis according to the invention is then applied to the identified flow motion region to determine characteristics of the flow motion.

According to an aspect of the invention, the system uses modeling, preferably elliptical modeling, to represent features of the identified flow motion area, such as, for example, the flow motion's direction, position, eccentricity, area, and circularity.

According to another aspect of the invention, the system includes an alarm system configured to analyze the identified flow motion region's characteristics and to generate one or more alarms upon detection of potentially dangerous flow motion, preferably using a cross-layer optimization technique, known in the art. Optionally, the system transmits the flow motion data to a remote system operator or other automated system over a network. This data may include, but is not limited to alarm data, flow statistics, still frames of the inputted video data, or a raw or enhanced feed of the inputted video data. Further, the flow motion data may be stored in a computer-readable memory to create a historical profile related to the monitored scene.

According to another aspect of the invention, the system distinguishes between an image's flow motion and other motion caused by foreign objects, referred to as global motion. In addition, the system identifies and eliminates any camera motion caused by, for example, environmental factors, including but not limited to a rain, snow, earthquakes, or wind. Thus, the system reduces ambient motion and focuses on the flow motion region of the targeted area. Advantageously, this results in a more efficient and accurate alarm system having fewer false alarms caused by ambient motion unrelated to flow motion.

BRIEF DESCRIPTION OF THE DRAWINGS

The present invention will be more readily understood from the detailed description of the preferred embodiment(s) presented below considered in conjunction with the attached drawings, of which:

FIG. 6 shows a frame including local motion vectors, a mask and a frame including masked motion vectors, according to an embodiment of the invention;

FIG. 7 depicts an exemplary result of a flow motion analysis process, according to an embodiment of the invention;

FIG. 10 shows an exemplary monitoring and analysis of a flow motion detection based on color, shape, and motion analysis process, according to an embodiment of the invention;

It is to be understood that the attached drawings are for the purpose of illustrating concepts of the present invention and may not be to scale.

DETAILED DESCRIPTION OF THE PREFERRED EMBODIMENTS

The present invention relates to methods, devices and systems for detecting and analyzing the motion of a flow, such as a mudslide.

Figure 1:
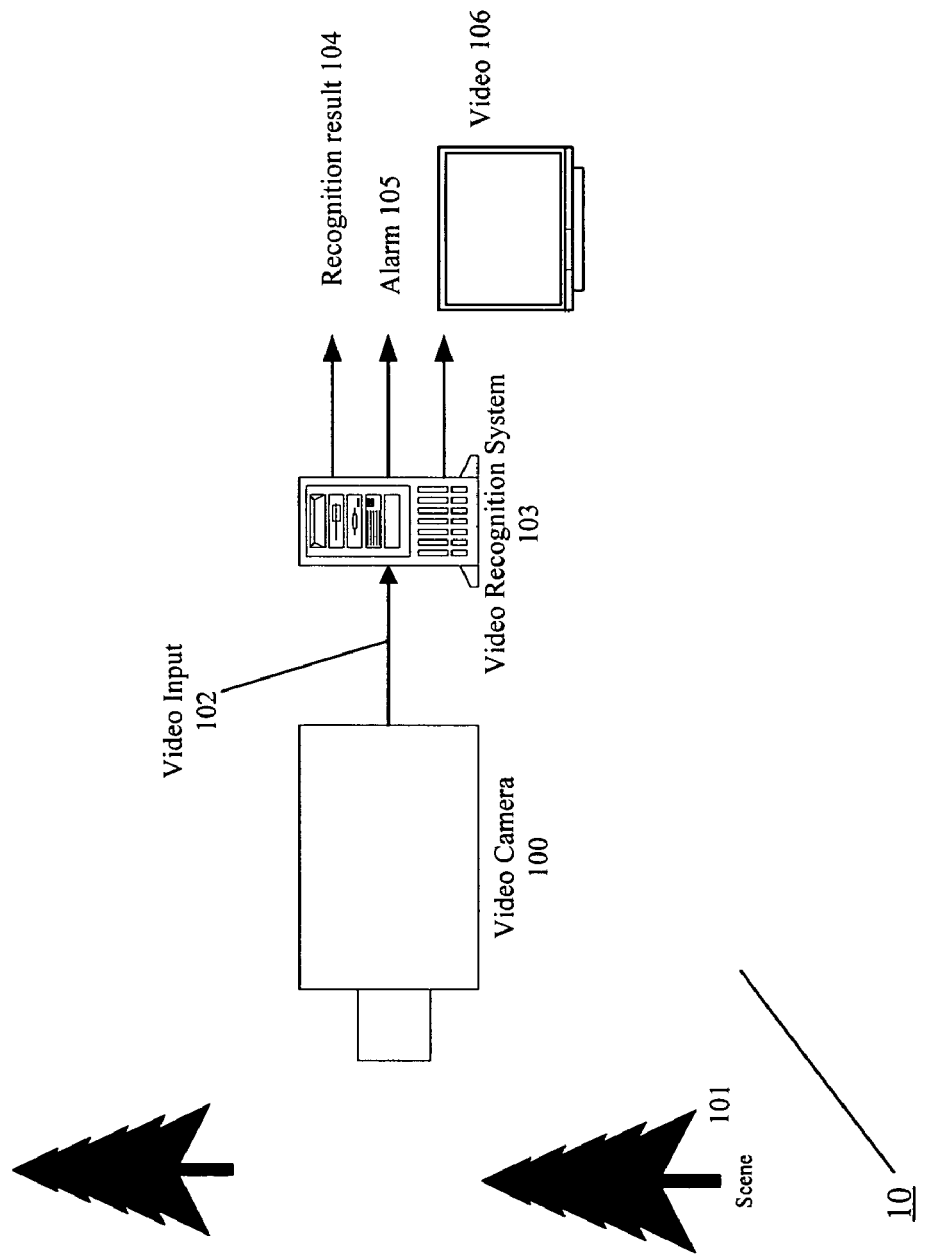
FIG. 1 is a schematic diagram of a surveillance system, according to an embodiment of the present invention.

FIG. 1 illustrates an exemplary arrangement of components of a flow detection and motion analysis system 10 according to the invention. Specifically, FIG. 1 shows a video camera 100, well known in the art, positioned to monitor a scene 101 that may contain one or more events or objects of interest. It should be noted that although the embodiments of the present invention are described as using a video camera, one of ordinary skill in the art will readily appreciate that any image capturing device may be used. In addition, it is to be appreciated that the image capturing device may be positioned relative to the scene 101 in a variety of ways, such as above the scene in a satellite.

The video camera 100 provides a video input 102 to a communicatively connected computer, referred to as a video recognition system 103. The term "communicatively connected" is intended to include any type of connection, whether wired or wireless, in which data may be communicated. The term "communicatively connected" is intended to include a connection between devices within a single computer or between devices on separate computers. The term "computer" is intended to include any data processing device, such as a desktop computer, a laptop computer, a personal digital assistant, a server, or any other device able to process data. One of ordinary skill in the art will appreciate that the video camera 100 may be connected to the video recognition system 103 via a LAN, WAN, or other web-based network, such as the Internet.

Optionally, the video recognition system 103 may include one or more microprocessors, video input/output interfaces and other optional devices. Optionally, the video recognition system 103 may include a number of input interfaces for receiving multiple video inputs 102 from multiple video cameras 100.

The video recognition system 103 includes one or more processes that perform analysis on the video input 102. The one or more processes, discussed in detail below, may be one or more computer-executable software programs executed by the video recognition system 103.

The video recognition system 103 uses the one or more processes to detect each flow motion region of the video input 102 and determine a flow's behavior and characteristics, referred to as recognition results 104. Optionally, the video recognition system 103 may include an alarm generation system for outputting alarms 105.

Figure 2:
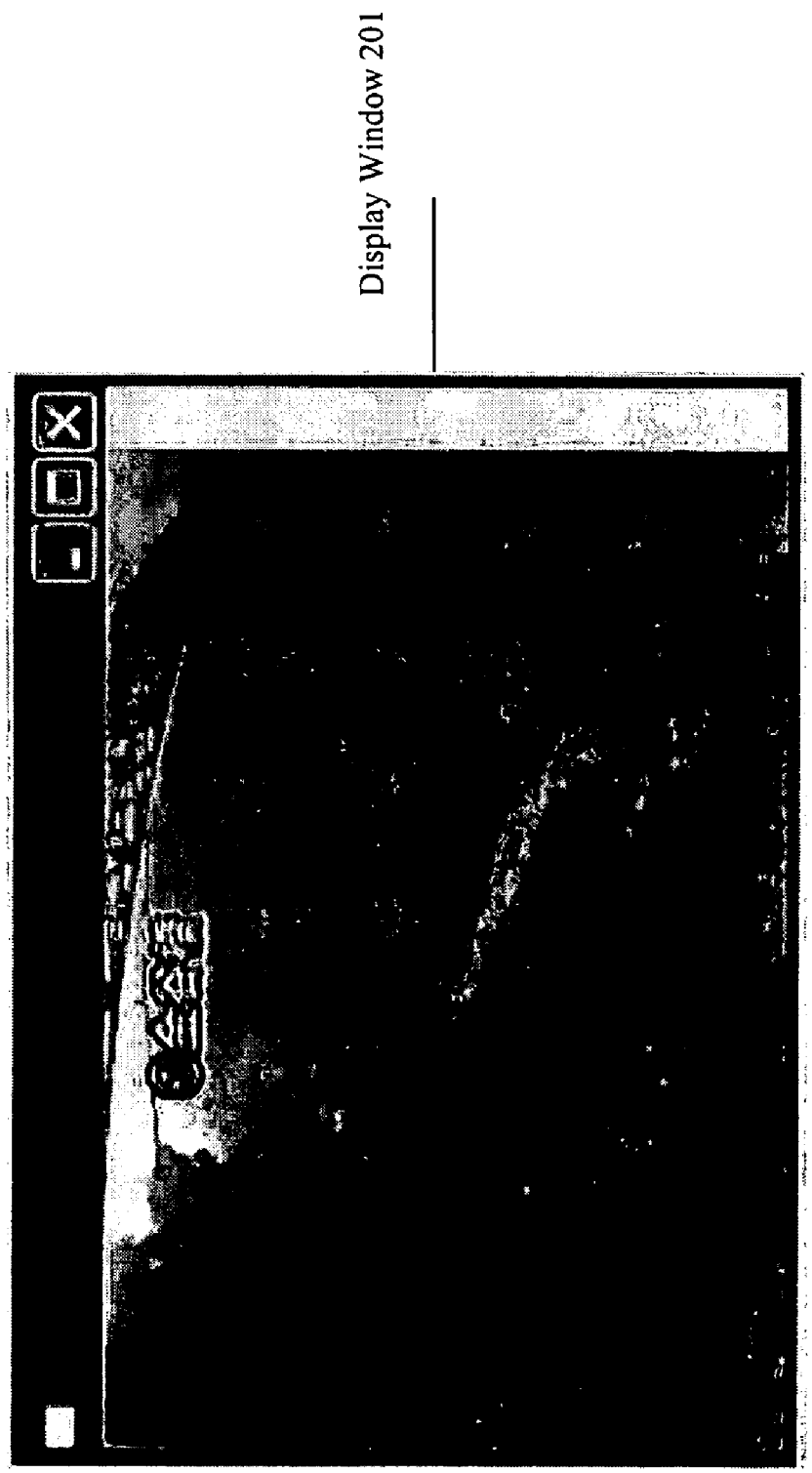
FIG. 2 depicts a display window showing an exemplary video image of a monitored scene, according to an embodiment of the invention.

The video recognition system 103 may output and display a video image 106, allowing an operator to view an image of the scene 101. Optionally, the video image 106 may be in its raw form or in an enhanced form, i.e., fitted with a contour or shape (e.g. an ellipse), as described in detail below. The outputs 104, 105, 106 may be sent to a locally connected display unit for observation by an operator or transmitted over a network and displayed remotely. Typically, the operator uses an interface with a display window 201, such as shown in FIG. 2, to view the outputs 104, 105, 106. In addition, the use of wireless video surveillance tools provides remotely located security personnel real-time access to the video camera 100 and the video recognition system 103 via a computer.

Advantageously, instead of sending a stream of video frames, the system 10 transmits discrete data sets representing an identified flow motion region, such as flow statistics (e.g., speed, direction, angle, area, etc.), alarm data, and abstract representations of the scene 101 (i.e., ellipses that represent the shape of the flow). Delivery of a discrete set of representative data (typically, a few floating-point variables) reduces the amount of bandwidth required for the transmission, thus enabling real-time display of the raw or enhanced video on one or more remote computers.

Optionally, the system 10 detects other sensory information related to the scene 101, such as audio information. This additional sensory information enables the system 10 to work under extreme environmental conditions, e.g. fog, where the visual input to the camera 100 is compromised. For example, the audio pattern of a mud or water flow may be detected and analyzed to determine flow characteristics and, if necessary, generate alarms.

According to the present invention, the video recognition system 103 identifies a flow motion region using on or more processes described in detail below.

Figure 3:
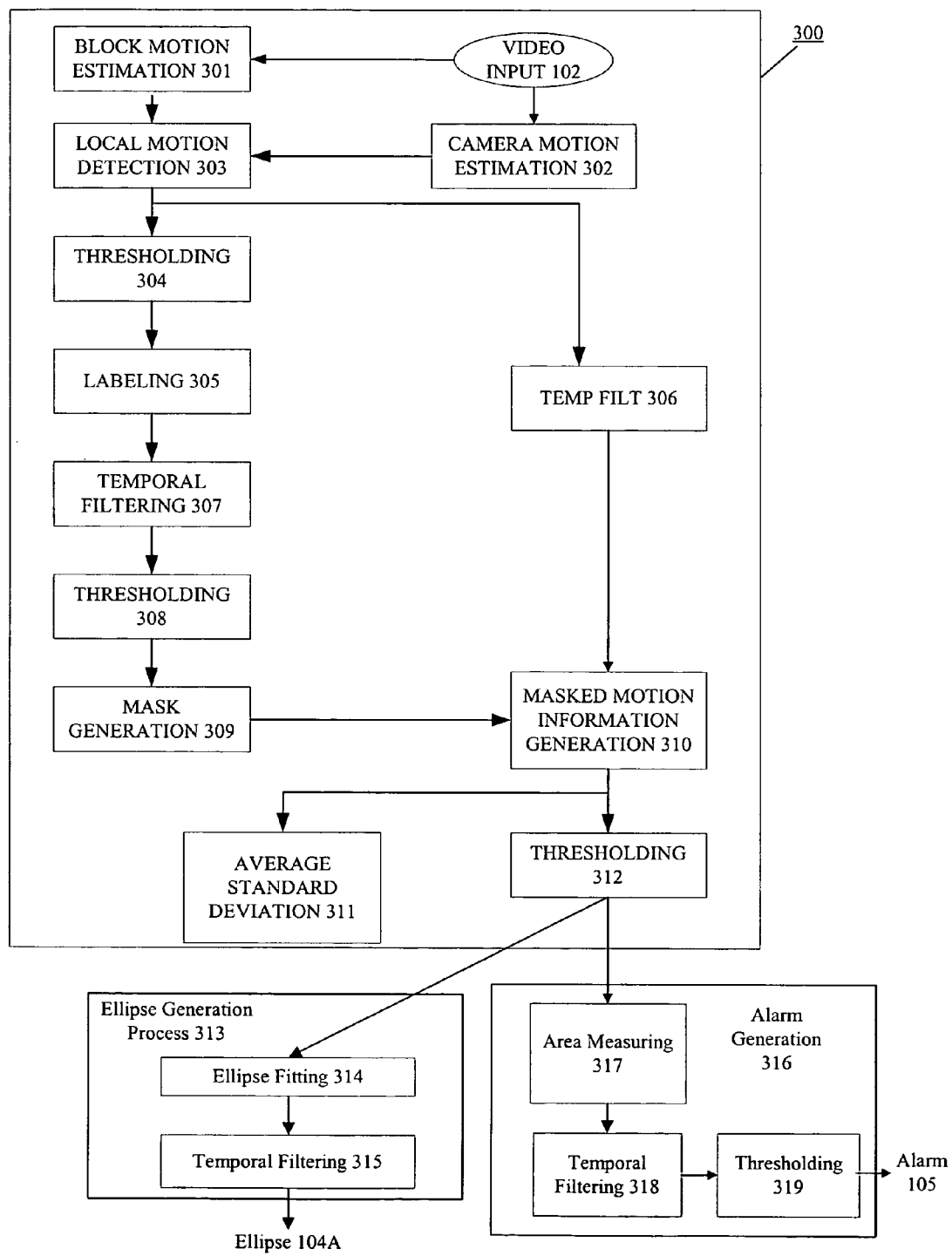
FIG. 3. is a schematic diagram of a flow motion analysis process, according to an embodiment of the invention.

FIG. 3 depicts an exemplary method for identifying and analyzing a flow motion region in a scene, referred to as a Flow Motion Analysis 300. The Flow Motion Analysis 300 receives an input, such as a video input 102, as shown in FIG. 3. Optionally, the Flow Motion Analysis 300 can receive alternative inputs, such as, for example, the result of another process, as described in detail with respect to FIG. 9. Typically, the video input 102 is inputted into the Flow Motion Analysis 300 on a frame by frame basis.

In the Flow Motion Analysis 300, the video input 102 undergoes two types of motion estimation: a Block Motion Estimation and a Camera (global) Motion Estimation.

Figure 4A:
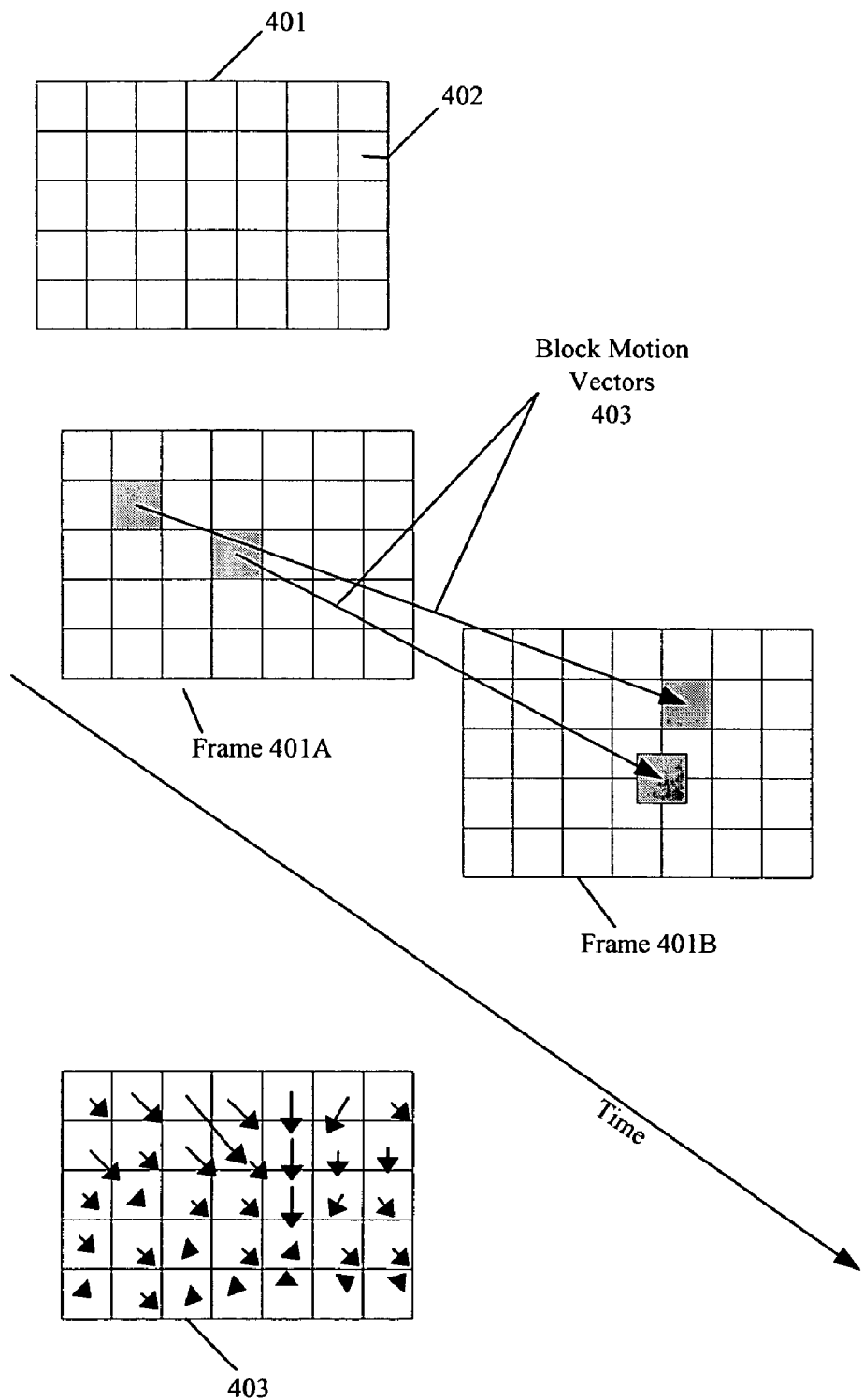
FIG. 4A depicts an exemplary block motion estimation step, according to an embodiment of the invention.

A Block Motion Estimation step 301, as shown in FIG. 4A, is used to determine which region or regions of the video input 102 include motion. According to FIG. 4A, each frame 401 of the video input 102 is divided into a number of small N by M rectangular blocks 402. For example, N may be an integer between 2 (including 2) and the video input 102 image width and M may be an integer between 2 (including 2) and the video input 102 image height.

FIG. 4A depicts an exemplary frame including block motion vectors 403, representing speed and direction, determined by comparing consecutive frames of the video input 102 using any true motion estimation method. Suitable true motion estimation methods for use in the invention include, but are not limited to those described in the article entitled "An iterative image-registration technique with an Application to Stereo Vision", DARPA Image Undersing Workshop, pp. 121-130 (1981) by B. D. Lucas et al., U.S. Pat. No. 5,072,293 (issued to Dehaan et al.), U.S. Pat. No. 5,682,438 (issued to Kojima et al.) and U.S. Pat. No. 5,072,293 (issued to Dehaan et al.), all of which are incorporated herein by reference in their entirety.

Figure 4B:
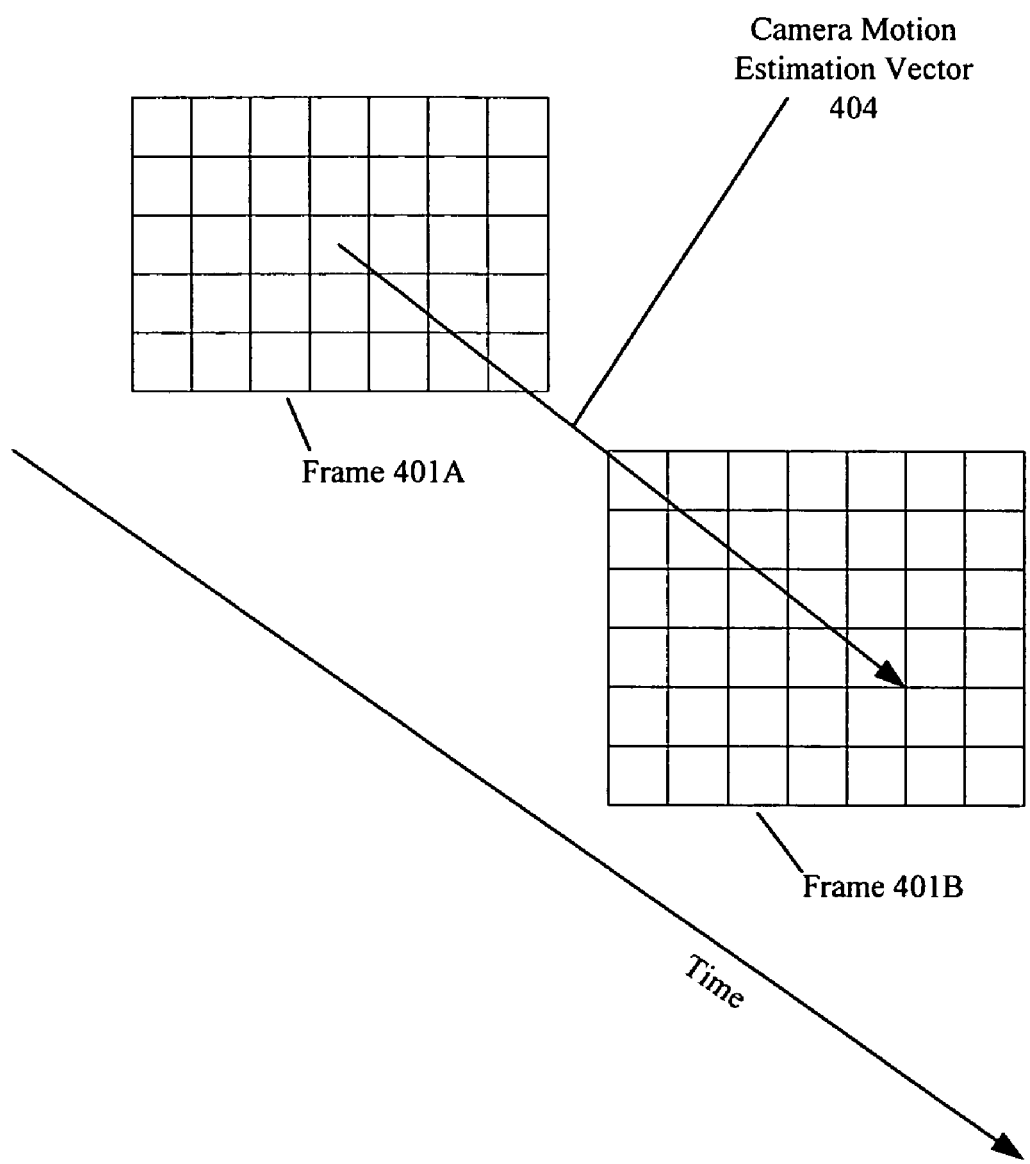
FIG. 4B shows an exemplary camera motion estimation step, according to an embodiment of the invention.

A Camera Motion Estimation step 302 is used to compensate for any motion caused by movement of the camera 100 itself and is applied to the video input 102 In step 302, ambient (or non-critical) motion caused by movement of the camera 100 is measured using any known motion estimation method. FIG. 4B shows a schematic depiction of an exemplary camera motion estimation method suitable for use in the invention. In FIG. 4B, consecutive frames 401A, 401B of the video input 102 are analyzed to generate camera motion vectors 404 according to well known methods in the art to determine the overall movement of the blocks 402 of frames 401A, 401B over time. One of ordinary skill in the art will appreciate that the Camera Motion Estimation step 302 is optional, and may be omitted in instances when camera motion is small or non-existent (i.e., when the camera is fixed to a firm base).

Next, outputs or results of the Block Motion Estimation step 301 and Camera Motion Estimation step 302 are passed to a Local Motion Detection step 303. In step 303, a local motion region is calculated by subtracting the camera motion determined in step 302 from the block motion vectors 403 calculated in step 301, according to any suitable method known in the art.

The local motion region identified in step 303 represents an initial or predicted flow motion region. In a preferred embodiment, to identify a more accurate flow motion region, the predicted flow motion region undergoes an optional refinement process. A person having ordinary skill in the art will readily appreciate that the refinement process may be iteratively applied and may include as many iterations and varying methods depending on the requirements of a given application.

The first stage of the refinement process occurs in a Thresholding step 304. Thresholding, a refinement technique known in the art, involves the setting of a threshold which is used for comparison with a motion vector's magnitude. In step 304, local or block motion vectors 402 generated by the Local Motion Detection step 303 having a magnitude greater than or equal to the threshold are outputted to a Labeling step 305. In step 305, these motion vectors are classified and the corresponding blocks are labeled with information related to the motion, referred to as one or more "motion labels." A motion label of a block may include but is not limited to motion magnitude, motion direction, and a variable indicating whether the speed of the block is above a threshold.

As a result of the Labeling step 305, any motion vector greater than or equal to the threshold are labeled and outputted to another known refinement technique, a temporal filtering method, referred to as a Temporal Filtering step 307. Generally, as is known in the art, a temporal filtering method smoothes changes in motion vectors over time. An exemplary temporal filtering method suitable for use in the invention utilizes a low-pass filter to compare and average the local motion vectors of corresponding blocks of two frames captured at different times along the time axis.

Figure 5A:
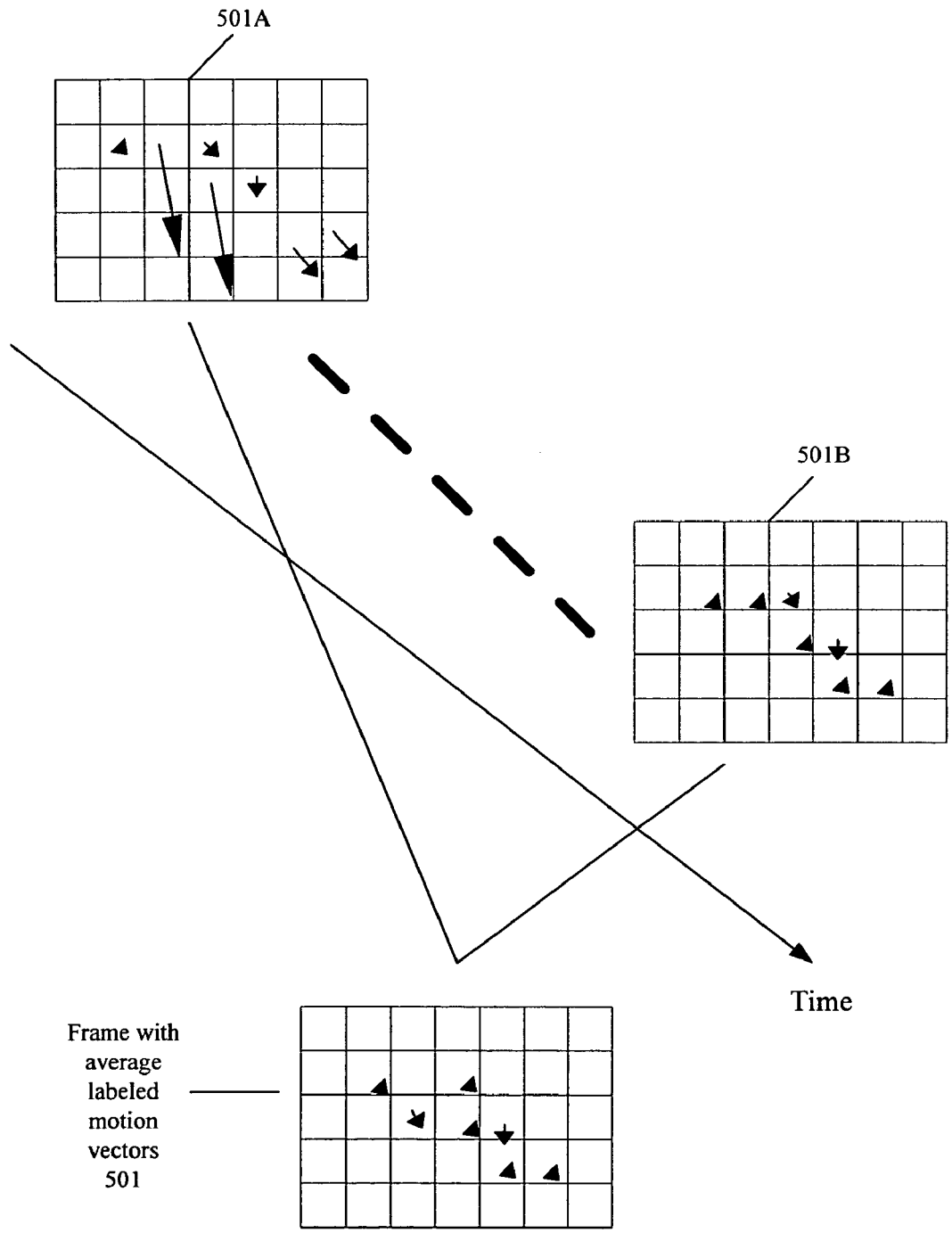
FIG. 5A shows a temporal filtering of two frames including labeled motion vectors, and a frame including average labeled motion vectors, according to an embodiment of the invention.

FIG. 5A shows an exemplary temporal filtering technique wherein two frames 501A, 501B are compared and temporally filtered according to any known temporal filtering method. The Temporal Filtering step 307 outputs a single frame 501 that includes an average among the motion vectors corresponding to the blocks of frames 501A, 501B.

The Temporal Filtering steps 307 functions to predict non-flow motion (i.e., motion caused by foreign objects including but not limited to humans, birds, trees, etc.), distinguish between the non-flow motion and flow motion, and reduce the effects of the non-flow motion. For example, a block within a frame may include motion caused by an animal moving through the monitored scene. When the animal is moving through a block, the block will have a motion vector of 1. When the animal moves out of the block, the motion vector for that block will change to 0 (or a motion vector consistent with the background). By averaging the motion vectors of a given block over a number of frames captured over time, non-flow motion, such as the animal walking through the monitored area, has a minimal effect on the overall average value of the motion vector in that block. For example, by averaging the motion vectors of a given block over 30 frames, an object covering that block for only 3 frames will have an average motion equal to $\frac{1}{10}$ of its speed. As such, the magnitude of the averaged motion vector for this block will be reduced and eliminated as being below the threshold.

If, on the other hand, a given block includes flow motion, the average value of the motion vector for the block taken over 30 frames will result in a relatively constant, high magnitude. Thus, the average motion vector of a block including flow motion will be above the threshold, thereby distinguishing between object motion and flow motion.

Each frame 501 outputted by the Temporal Filtering step 307 is passed to a Thresholding step 308 which performs a thresholding on motion vectors in the frame 501 according to the description above. In step 308, refinement results in a refined frame having motion vectors greater than or equal to the threshold, thereby producing a refined flow motion region.

Frames included the refined flow motion region are outputted to a Mask Generation step 309. In the Mask Generation step 309, a mask 602, shown in FIG. 6, is generated to cover the refined flow motion region. The mask 602 is then provided to a Masked Motion Information Generation step 310 for use in another refinement stage, described below.

Figure 5B:
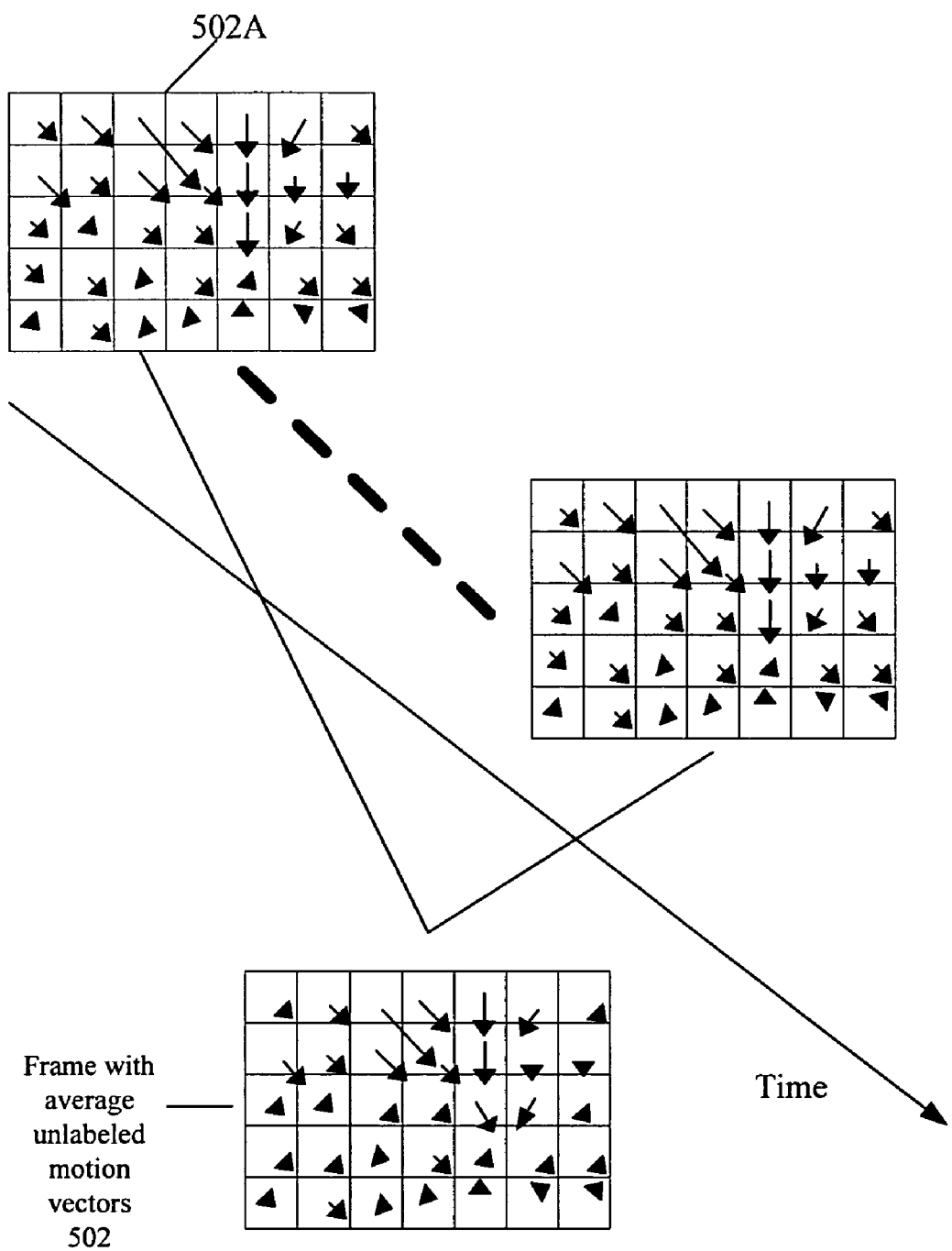
FIG. 5B shows a temporal filtering of two frames including unlabeled motion vectors, and a frame including average unlabeled motion vectors, according to an embodiment of the invention.

As depicted in FIG. 3, the output of the Local Motion Detection step 303 is fed along a second branch to the Masked Motion Information Generation step 310. Optionally, a Temporal Filtering step 306 may be applied to the output of the Local Motion Detection step 303. In step 306, whole frames (i.e., unlabeled and unrefined frames) including the initial motion vectors of the predicted flow motion region undergo temporal filtering. FIG. 5B shows an exemplary temporal filtering process wherein a temporal low-pass filter is applied to the unlabeled motion vectors of whole frames 502A, 502B resulting in a frame including an average of the unlabeled motion vectors 502. This frame 502 is passed to the Masked Motion Information Generation step 310.

In step 310, as shown in FIG. 6, the mask 602 is applied to a frame with local motion vectors 502, whereby the local motion vectors not covered by the mask 602 are removed. This results in a masked area including masked motion vectors 603. The frame including the masked area is outputted to an Average, Standard Deviation Calculation step 311, where the average and the standard deviation of the masked motion vectors 603 are calculated. In a preferred embodiment, the average and standard deviation of x and y components of the masked motion vectors are calculated separately, and a cross correlation of x components and y components also is calculated. The calculation results in an adaptive threshold which is used to refine the masked area. In a preferred embodiment, the adaptive threshold may be the linear combination of the average and standard deviation. Specifically, the adaptive threshold is applied to the frame with local motion vectors 502 (outputted from the Temporal Filtering step 306) in a Thresholding step 312. Applying the adaptive threshold to the whole frame 502 identifies the portion of the frame including local motion vectors with magnitudes above the adaptive threshold, referred to as an identified flow motion region.

An exemplary output 701 of the Flow Motion Analysis 300 is shown in FIG. 7, wherein the identified flow motion region is represented by the area covered by the mask 602. The identified flow motion region is now analyzed to determine the behavior or characteristics of the flow motion. The overall flow direction and speed of the flow motion may be determined by averaging the motion vectors of the flow motion region. The location of the flow may be determined by identifying a center of the flow motion region. The area of the flow may be measured by counting the number of pixels inside the flow motion region. One of ordinary skill in the art will appreciate that the flow area may be measured according to other known techniques, such as, for example, area measurement derived from shape.

Figure 8:
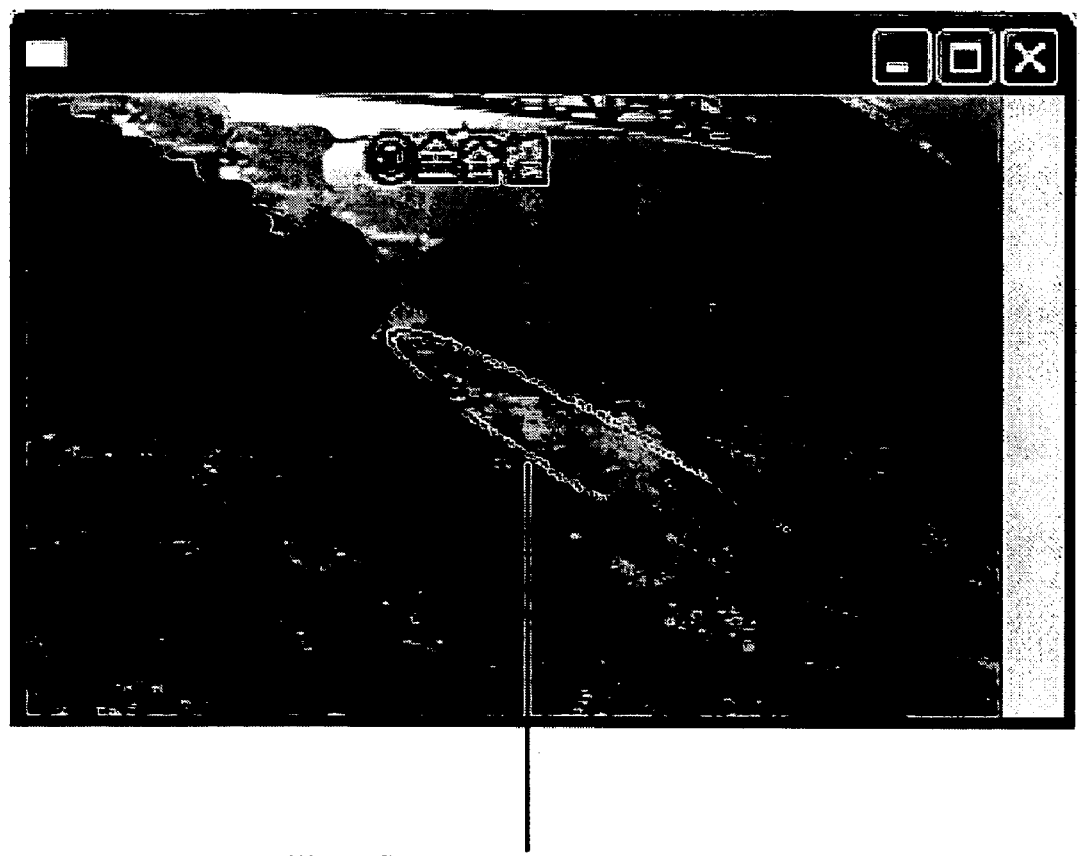
FIG. 8 depicts an exemplary ellipse fitted to the result shown in FIG. 7, according to an embodiment of the invention.

Optionally, in another embodiment of the present invention, the output of the Flow Motion Analysis 300 is fed to a process for generating and fitting a shape, preferably an ellipse, to the identified flow motion region, referred to as an Ellipse Generation Process 313. In the Ellipse Generation Process 313, an ellipse is fitted to the identified flow motion region in an Ellipse Fitting step 314. In step 314, any known ellipse fitting method may be applied. Once generated, the ellipse is fitted to the identified flow region, resulting in an ellipse fitted flow motion region 801, shown in FIG. 8. Next, a Temporal Filtering step 315 (i.e., using a low-pass filter to smooth the changes of the ellipse over time) is applied to the characteristics of the identified flow motion region resulting in a temporally filtered ellipse 104A, which is an exemplary recognition result 104. The temporal filter used to obtain the ellipse 104A may be any low-pass filter that smoothes the changes of ellipse parameters over time, as known in the art. These characteristics include but are not limited to location, area, direction, speed, and a semi-axis of the ellipse. Advantageously, an elliptical model may be used to generate representative data related to the flow motion of the identified flow motion region.

In yet another embodiment of the present invention, the output of the Flow Motion Analysis 300 is provided to an Alarm Generation Process 313. In the Alarm Generation Process 313, the total area of the identified flow motion region is measured by counting the number of blocks covered by the one or more identified flow motion regions, in an Area Measuring step 314. The area is averaged over a total number of frames in a Temporal Filtering step 315 which functions in a manner similar to the Temporal Filtering step 307 discussed above. Following the temporal filtering, a thresholding is conducted in a Thresholding step 315. In step 315, if the area reaches or exceeds a certain threshold (set by a user), an alarm 105 is generated. The alarm 105 may include a variety of information, including but not limited to the flow motion's size, severity, and direction.

Figure 9:
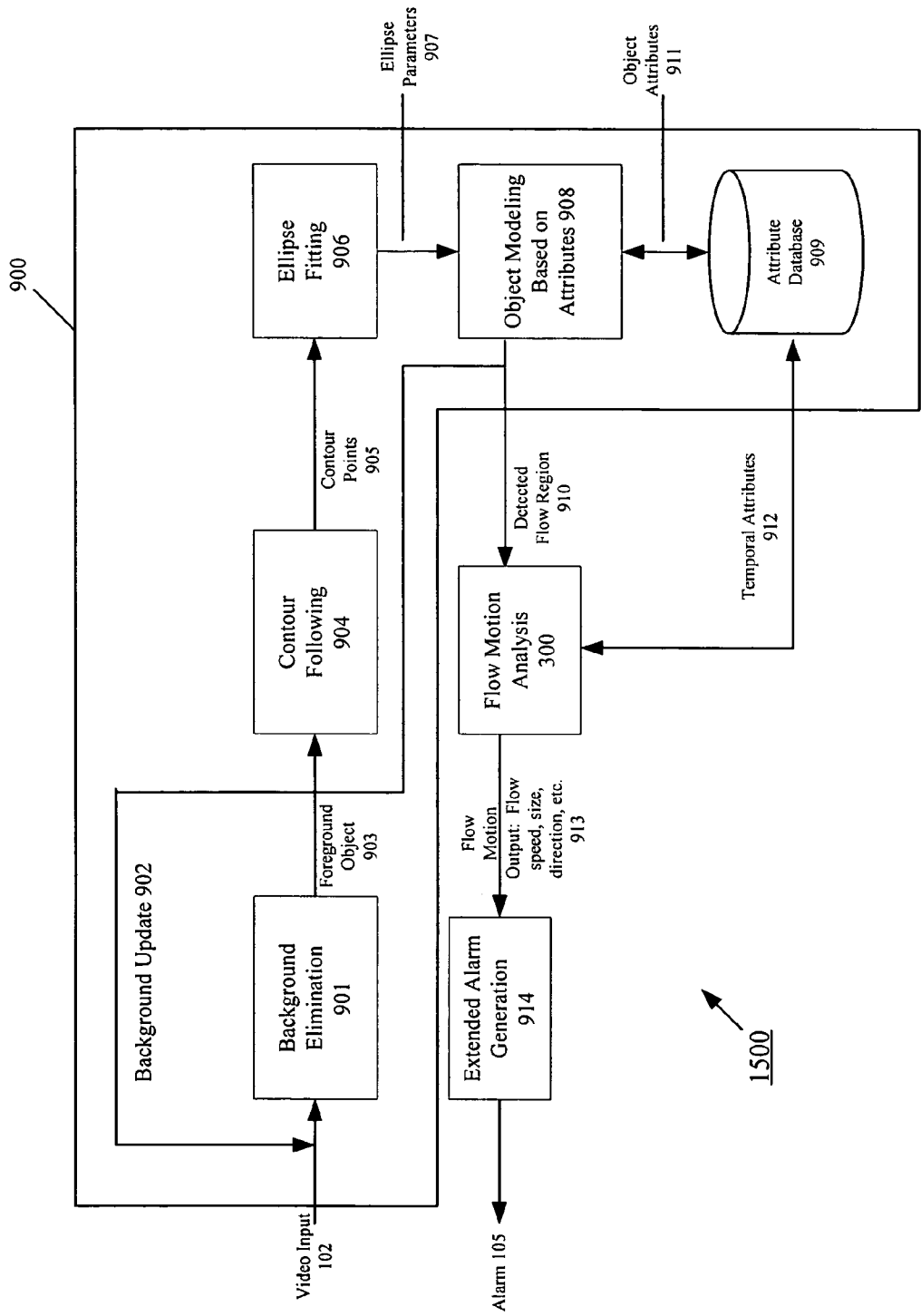
FIG. 9 is a block diagram of a system for performing flow motion detection based on color, shape, and motion analysis, according to an embodiment of the invention.

FIG. 9 depicts a procedure 1500 for performing flow motion identification and analysis based on the flow's attributes and motion. As shown, the procedure 1500 includes two primary processes: a Flow Motion Detection Based on Attributes Process 900 and a Flow Motion Analysis 300 (as described in detail above with respect to FIG. 3). The Flow Motion Detection Based on Attributes Process 900 functions to detect a flow region based on its attributes, including but not limited to shape and color. A detected flow region 910 generated by this process is fed to the Flow Motion Analysis Process 300 for refinement of the detected flow area and analysis of the flow motion.

According to an exemplary Flow Motion Detection Based on Attributes Process 900, a Background Elimination step 901 is performed on a video input 102 of a monitored scene 1000 (see FIG. 10). Any suitable method for identifying and eliminating the background of the video input 102 image may be employed in step 901. An exemplary background elimination method is described in U.S. Patent Application Publication No. 2004/0120581 (of Ozer, et al.), the entirety of which is incorporated herein by reference. This background elimination method utilizes a feedback from the Object Modeling Based on Attributes step 908 (described in detail below) to upgrade the background-foreground extraction.

In a preferred embodiment, the Background Elimination step 901 employs a background model that uses DC coefficients of the Discrete Cosine Transform (DCT) of each block in the background region. That is, for each block in the background region, the Background Elimination step 901 captures the block's DC coefficients over a number of frames and calculates the mean and variance of the coefficients. Based on these calculations, the procedure 1500 recognizes the changed area over the span of two or more frames. In a preferred embodiment, a Background Update step 902 may be used to adaptively update the background using, for example, a Gaussian updating method, known in the art. For example, if the foliage changes, there will be a change in the monitored scene, but the adaptive background method will recognize this as a background change. Generally, the time required to update the background depends on an update parameter typically set by the operator.

In a preferred embodiment, the video input 102 is an analog NTSC signal. A video capture device of system 10 converts the analog NTSC signal into RGB color components. Next, the system 10 stores Discrete Cosine Transform (DC) coefficients of the color components obtained from several background frames and the standard deviation corresponding to the Discrete Cosine Transform blocks in separate buffers. DC blocks, which represent the average of the Discrete Cosine Transform (DC) blocks, with a larger standard deviation than the background are identified as a Foreground Object 903.

By eliminating the background of the video image, the Background Elimination step 901 identifies and outputs the Foreground Object 903. The Foreground Object 903 is fed to a Contour Following step 904. In step 904, any known contour following method suitable for use in the invention may be employed. A preferred embodiment utilizes a 3×3 filter to follow an edge of the Foreground Object 903. The filter moves in any of eight directions to follow the edge. The monitored scene 1000 including contour following is shown at 1001.

The Contour Following step 904 outputs a plurality of Contour Points 905 corresponding to the contoured Foreground Object 903 and passes this information to an Ellipse Fitting step 906. Any known ellipse fitting method may be used with the present invention. In a preferred embodiment, a 2D approximation of the Foreground Object 903 (i.e., the flow region) is determined by fitting ellipses with shape-preserving deformations to overcome the occlusion problem caused by different factors, e.g., animals, trees, etc. Each contour is fitted to an ellipse having at least five Ellipse Parameters 907, namely two location parameters, one rotation parameter, and two axis length parameters. A suitable ellipse fitting method for use in the invention includes, but is not limited to the template matching method described in an articled entitled "Object Detection and Activity Recognition in Digital Image and Video Libraries", Ph.D. Thesis, New Jersey Institute of Technology, NJ, (2000) by I. B. Ozer, the entirety of which is herein incorporated by reference. One of ordinary skill in the art will appreciate that while the preferred embodiment uses ellipse fitting, alternative shapes other than ellipses may be used.

FIG. 10 shows an example of a captured image fitted with an ellipse 1002. The Ellipse Parameters 907 are outputted to an Object Modeling Based on Attributes step 908. In step 908, several descriptors, or Object Attributes 911, of the flow are calculated using the Ellipse Parameters 907.

Low-level attributes include but are not limited to unary features (e.g., color, texture, eccentricity, area) and temporal features (e.g., motion vectors). The flow areas show similar characteristics in terms of these unary features and temporal features. These low level features are collected by analyzing different video inputs. The statistics (e.g., mean and variance) are then computed and stored in a database, referred to as an Attribute Database 909. The computed statistics of the low-level attributes are compared to previously determined statistics stored in the Attribute Database 909 in order to detect flow areas. The statistics of the detected flow areas are then used to compute high-level attributes. High-level attributes include but are not limited to flow location, flow growth, and flow direction. Optionally, the Object Attributes 911 of the detected flow areas may be stored in the Attribute Database 909 for use in future analysis of this flow motion area. Furthermore, spatial rules, (i.e., binary features that give the spatial relation of the detected areas) with respect to the scene may form additional information for a particular scene. For example, scene-dependent information may be stored by applying manual or automatic scene analysis, e.g., labeling of sky areas.

Some conventional background elimination methods fail to accurately detect all of the flow area of an image. In these instances, the detected flow area may include gaps, resulting in a number of nonadjacent flow area segments. However, these segments typically share similar low-level attributes (e.g., color and orientation). In order to remedy this deficiency in the conventional methods, in step 908, a graph-matching algorithm is applied to combine these segments.

According to an exemplary graph-matching algorithm, detected flow areas are each assigned one or more nodes on a graph. Next, any two or more nodes in close proximity to one another are connected. Then, the attributes stored in the Attribute Database 909 corresponding to the two or more connected nodes are reviewed. If the nodes in the inputted image correspond to potential flow areas, i.e., the attribute statistics are similar to those stored in the Attribute Database 909 and are consistent with the spatial rules, these nodes are marked as flow areas and combined to form a larger ellipse. Conversely, nodes having dissimilar attributes are removed during the Object Modeling Based on Attributes step 908. Node comparison may be measured using, for example, a piecewise quadratic Bayesian classifier as described in U.S. Patent Application Publication No. 2004/0120581 (of Ozer et al.). For example, if a detected node includes a flying object in the inputted image, the node will have different color and/or texture attributes as compared to the surrounding nodes, which include the sky area. In this case, the node including the flying object is removed.

The observed flow characteristics are used to determine Temporal Attributes 912 which may be stored in the Attribute Database 909. The Temporal Attributes 912 may include but are not limited to statistics of low-level temporal attributes, such as eccentricity and area change, from the known flow area segments in order to associate the attributes of the inputted image to high-level temporal attributes such as flow location and growth direction, for example. The graph-matching algorithm of step 908 uses the Attribute Database 909 to label the segmented areas as flow area if the attributes of the combination of different segments match those in the Attribute Database 909 and to remove nodes that do not match the flow attributes. The Attribute Database 908 is updated to use the new flow attributes via feedback techniques.

The output of step 908, which is a Detected Flow Motion Region 910, is inputted into the Flow Motion Analysis 300, described in detail above with respect to FIG. 3. The Flow Motion Detection Analysis 300 refines the Detected Flow Motion Region 910 and produces an output that includes an identified flow motion region and the flow's characteristics, including but not limited to the flow location, flow size, and flow speed. The output is referred to as Flow Motion Information 913. FIG. 10 shows a monitored image 1003 resulting from the Flow Motion Analysis 300.

According to the embodiment shown in FIG. 9, the Flow Motion Information 913 is fed to an alarm generation process, referred to as an Extended Alarm Generation Process step 914. In step 914, the Flow Motion Information 913 is compared to customizable thresholds and, if necessary, an alarm 105 is generated based on this comparison. Optionally, the alarm 105 may be sent through a wireless or wired network to other local or remote locations. Optionally, the ellipse 1002 can be displayed in a color, such as red, to indicate that the identified flow motion region is in an alarm state.

Figure 11:
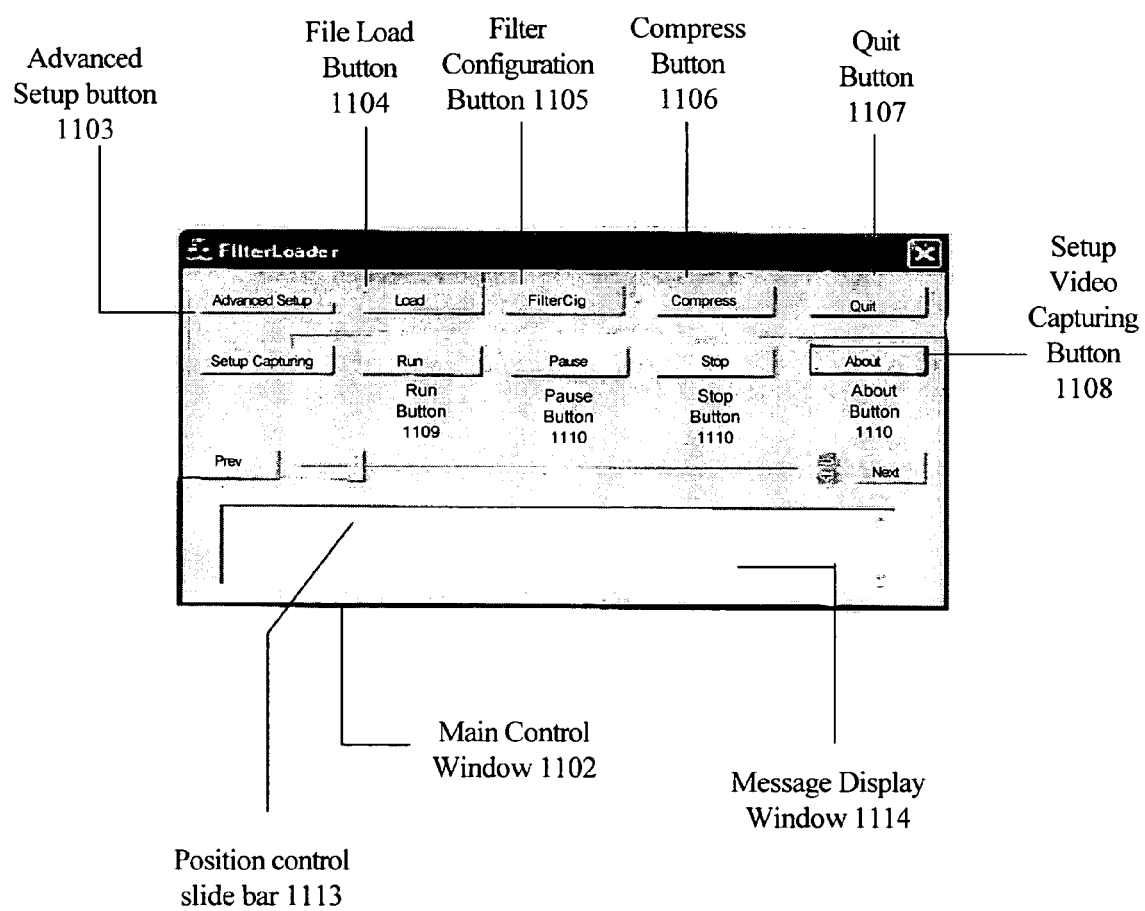
FIG. 11 is an exemplary main operator interface window, according to an embodiment of the invention.
Figure 12:
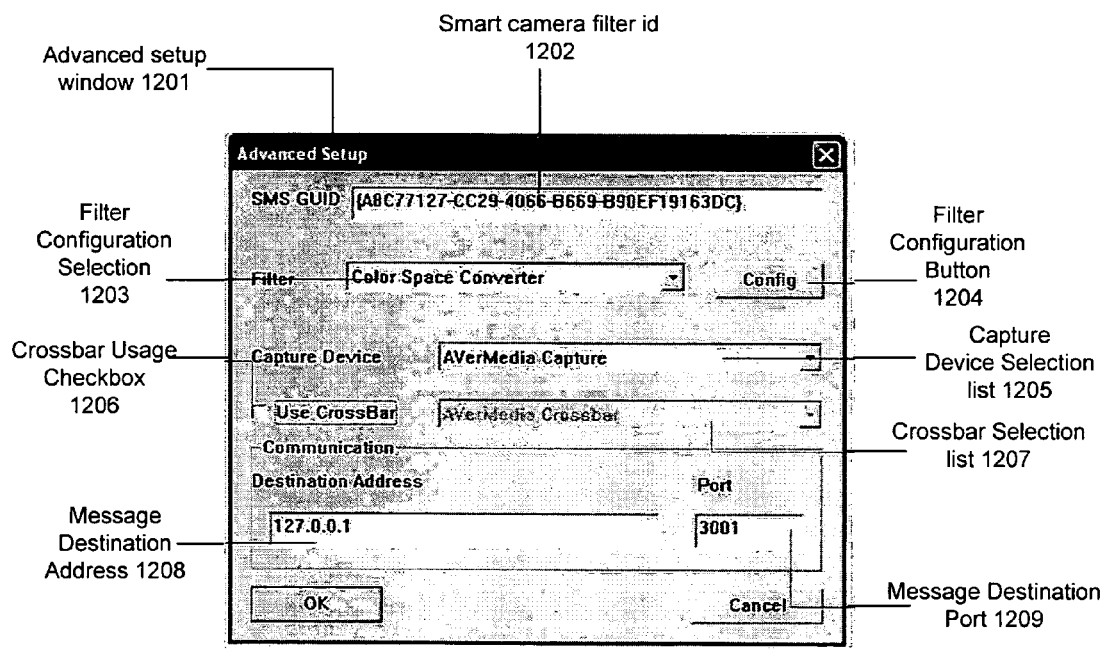
FIG. 12 is an exemplary advanced setup window, according to an embodiment of the invention.
Figure 13:
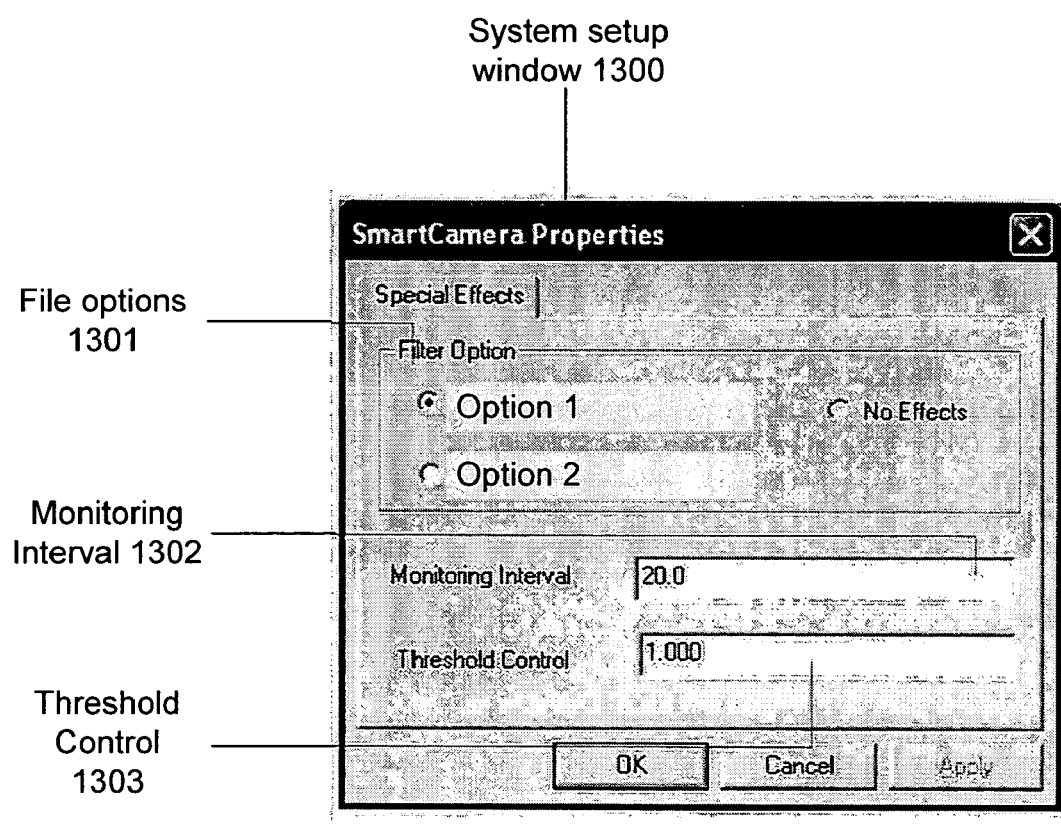
FIG. 13 is an exemplary system setup window, according to an embodiment of the invention.

FIGS. 11-13 show exemplary operator interface windows for operation of the flow detection and motion analysis system 10, according to a preferred embodiment of the present invention. In FIG. 11, a Main Control Window 1102 enables an operator to control the different video input types (e.g., captured real-time video or stored video formats, such as, for example, AVI and MPEG formats). An Advanced Setup button 1103 provides the operator with access to an Advanced Setup window 1201, which enables the operator to select a video capturing device from a list and helps the operator select one or more remote devices on the network to send the necessary information. The Advanced Setup window 1201, shown in FIG. 12, is described in greater detail below.

Referring to FIG. 11, a File Load button 1104 enables the operator to select a video sequence from a list of stored videos. A Filter Configuration button 1105 enables the operator to change a configuration of the filter by modifying its thresholds. A Compress button 1106 allows the operator to compress the video sequence according to any well known video compression format, e.g., MPEG, AVI, etc. A Quit button 1107 allows the operator to stop a current application and assists the operator in exiting the system 10. A Setup Video Capturing button 1108 enables the operator to change one or more properties of the selected video capturing device. Depending on the type of video capturing device used, such properties may include but are not limited to the format of the inputted video, the size of the inputted video, and other image quality features such as, for example, contrast and brightness. Additionally, the Setup Video Capturing button 1108 enables the operator to access other device control functions of the video capturing device.

A Position Control Slide bar 1113 enables the operator to select the point in a stored video sequence to view, as is well known in the art. A Message Display Window 1114 displays information to the operator, such as, for example, alarm information, flow direction, flow speed, flow angle, eccentricity, circularity and spatial position.

In addition, the Main Control Window 1102 may include a basic system control buttons, such as a Run button 1109, a Pause button 1110, and/or a Stop button 1111. Further, the Main Control Window 1102 may include an About button 1112 which provides a description of the application.

FIG. 12 depicts the Advanced Setup Window 1201. The Advanced Setup Window 1201 enables the operator to process a captured video stream. A Filter Configuration Selection drop-down list 1203 and a Configuration button 1204 enable the operator to configure various processing elements of the system 10, including but not limited to capturing devices and display devices.

A Capture Device drop-down list 1205 allows the operator to select a video capturing device. A Crossbar Usage Checkbox 1206 and a Crossbar Selection list 1207 allow the operator to enable a crossbar device, which is required by certain video capturing devices for proper operation.

A Message Destination Address field 1208 and a Message Destination Port 1209 enables the operator to send data to one or more remote receivers via a network. The operator selects a desired destination by inputting a remote receiver's IP address and port number in the Message Destination Address field 1208 and a Message Destination Port field 1209, respectively. Advantageously, if such a communication link is established, the system 10 will automatically send any alarm messages and other flow motion information to both the host and remote receivers.

FIG. 13 shows a System Setup Window 1300 according to an embodiment of the invention. The System Setup Window 1300 is used to configure the system 10 and set the threshold amounts. In addition, the System Setup Window 1300 enables the operator to select a process, wherein Option 1 corresponds to the Flow Motion Analysis 300 and Option 2 corresponds to the Flow Motion Detection Based on Attributes Process 900.

A Monitoring Interval button 1302 enables the operator to balance detection speed and robustness of detection. For example, a large monitoring interval value will increases the robustness of the detection but reduces the detection speed. Likewise, a small monitoring interval value increases the speed of the detection but reduces the robustness.

A Threshold Control button 1303 allows the operator to control a sensitivity of the detection. For example, a small threshold control value increases the system's sensitivity to motion.

Although the present invention has been described in considerable detail with reference to certain preferred embodiments and version, other versions and embodiments are possible. Therefore, the scope of the present invention is not limited to the description of the versions and embodiments expressly disclosed herein. The references and disclosure provided in the 'Background of the Invention' section are not admitted to be prior art with respect to the disclosure provided in the present application.

What is claimed is:

1. A method for identifying a flow motion region and one or more flow motion region characteristics, the method comprising the steps of:
    receiving a video input comprising a plurality of frames;
    identifying motion vectors for each of the plurality of frames;
    identifying a predicted flow motion region in at least one of the plurality of frames based at least in part on the motion vectors of the frame;
    temporally filtering the predicted flow motion region, wherein said temporally filtering comprising distinguishing between a non-flow motion and a flow motion in the predicted flow motion region, wherein said non-flow motion is a motion of non-interest and flow motion is a motion of interest;
    generating a mask based at least in part on the temporal filtered predicted flow motion region;
    applying the mask to a frame comprising the motion vectors to obtain an identified flow motion region; and
    determining one or more characteristics of the identified flow motion region.

2. The method of claim 1, further comprising the step of refining the predicted flow motion region by reducing an effect of predicted non-flow motion prior to the step of generating the mask.

3. The method of claim 1, further comprising the step of refining the identified flow motion region based at least in part on magnitudes of the motion vectors in the identified flow motion region.

4. The method of claim 1, wherein the motion vectors are identified using a block motion estimation method.

5. The method of claim 1, wherein the step of identifying the predicted flow motion region includes reducing an effect of video-input motion.

6. The method of claim 5, wherein the video-input motion is determined using a camera motion estimation method.

7. The method of claim 2, wherein the step of refining the predicted flow motion region includes eliminating motion vectors having magnitudes less than a predetermined threshold.

8. The method of claim 2, wherein the step of refining the predicted flow motion region reducing includes temporally filtering the motion vectors of two or more frames.

9. The method of claim 2, wherein the step of refining the predicted flow motion region includes labeling the predicted flow motion region with one or more motion labels.

10. The method of claim 1, further comprising the step of refining the motion vectors for each of the plurality of frames prior to the step of applying the mask.

11. The method of claim 10, wherein the step of refining the motion vectors includes temporally filtering the motion vectors of two or more frames.

12. The method of claim 3, wherein the step of refining the identified flow motion region includes calculating an average and a standard deviation of the magnitudes of the motion vectors in the identified flow motion region to produce an adaptive threshold, which is a linear combination of the average and standard deviation.

13. The method of claim 12, wherein the step of refining the identified flow motion region includes eliminating motion vectors in the identified flow motion region having magnitudes less than the adaptive threshold.

14. The method of claim 1, further comprising the step of fitting a shape to the identified flow motion region.

15. The method of claim 14, wherein the shape includes an ellipse.

16. The method of claim 15, further comprising the step of refining the ellipse-fitted identified flow motion region.

17. The method of claim 16, wherein the step of refining the ellipse-fitted identified flow motion region includes temporally filtering motion vectors thereof.

18. The method of claim 17, further comprising the step of analyzing the refined ellipse-fitted identified flow motion region to determine characteristics thereof.

19. The method of claim 1, furthering comprising the step of generating an alarm based at least in part on the identified flow motion region.

20. The method of claim 19, wherein the alarm is generated when an area of the identified flow motion region is greater than or equal to an alarm threshold.

21. The method of claim 1 wherein the determined characteristic(s) includes a direction of the identified flow motion region.

22. The method of claim 21, wherein the direction of the identified flow motion region is determined by calculating an average of the motion vectors of the identified flow motion region.

23. A system for identifying a flow motion region and one or more flow motion region characteristics, comprising:
    a video camera; and
    a computer communicatively connected to the video camera, wherein the computer is programmed to:
    receive a video input comprising a plurality of frames;
    identify motion vectors for each of the plurality of frames;
    identify a predicted flow motion region in at least one of the plurality of frames based at least in part on the motion vectors of the frame,
    temporal filter the predicted flow motion region to distinguish between a non-flow motion and a flow motion, wherein said non-flow motion is a motion of non-interest and flow motion is a motion of interest;
    generate a mask based at least in part on the temporal filtered predicted flow motion region;

apply the mask to a frame comprising the motion vectors to produce an identified flow motion region; and determine one or more characteristics of the identified flow motion region.

24. The system of claim 23, wherein the computer is programmed to refine the predicted flow motion region by reducing an effect of predicted non-flow motion prior to generation of the mask.

25. The system of claim 23, wherein the computer is programmed to refine the identified flow motion region based at least in part on magnitudes of the motion vectors in the identified flow motion region prior to determination of the one or more characteristics.

26. A computer-implemented method for identifying a flow motion region and one or more flow motion region characteristics, the method comprising the steps of:

receiving a video input comprising a plurality of frames;

identifying motion vectors for each of the plurality of frames;

identifying a predicted flow motion region in at least one of the plurality of frames based at least in part on the motion vectors of the frame;

temporally filtering the predicted flow motion region, wherein said temporally filtering comprising distinguishing between a non-flow motion and a flow motion in the predicted flow motion region, wherein said non-flow motion is a motion of non-interest and flow motion is a motion of interest;

generating a mask based at least in part on the temporal filtered predicted flow motion region;

applying the mask to a frame comprising the motion vectors to produce an identified flow motion region; and determining one or more characteristics of the identified flow motion region.

27. The method of claim 26, further comprising the step of refining the predicted flow motion region by reducing an effect of predicted non-flow motion prior to the step of generating the mask.

28. The method of claim 26, further comprising the step of refining the identified flow motion region based at least in part on magnitudes of the motion vectors in the identified flow motion region prior to the step of determining the one or more characteristics.

29. A computer-readable storage medium storing computer code for implementing a method for identifying a flow motion region and one or more flow motion region characteristics, wherein the method comprises the steps of:

receiving a video input comprising a plurality of frames;

identifying motion vectors for each of the plurality of frames;

identifying a predicted flow motion region in at least one of the plurality of frames based at least in part on the motion vectors of the frame;

temporally filtering the predicted flow motion region, wherein said temporally filtering comprising distinguishing between a non-flow motion and a flow motion in the predicted flow motion region, wherein said non-flow motion is a motion of non-interest and flow motion is a motion of interest;

generating a mask based at least in part on the temporal filtered predicted flow motion region;

applying the mask to a frame comprising the motion vectors to produce an identified flow motion region; and determining one or more characteristics of the identified flow motion region.

30. The computer-readable storage medium of claim 29, wherein the method further comprises the step of refining the predicted flow motion region by reducing an effect of predicted non-flow motion prior to generation of the mask.

31. The computer-readable storage medium of claim 29, wherein the method further comprises the step of refining the identified flow motion region based at least in part on magnitudes of the motion vectors in the identified flow motion region prior to determination of the one or more characteristics.

* * * * *